United States Patent
Scarlatti et al.

(10) Patent No.: US 9,234,973 B2
(45) Date of Patent: Jan. 12, 2016

(54) DEPLOYABLE GROUND SENSORS

(71) Applicant: The Boeing Company, Chicago, IL (US)

(72) Inventors: David Scarlatti, Madrid (ES); David Esteban-Campillo, Madrid (ES); Javier Garcia, Madrid (ES)

(73) Assignee: The Boeing Company, Chicago, IL (US)

( * ) Notice: Subject to any disclaimer, the term of this patent is extended or adjusted under 35 U.S.C. 154(b) by 442 days.

(21) Appl. No.: 13/870,325

(22) Filed: Apr. 25, 2013

(65) Prior Publication Data

US 2013/0308426 A1 Nov. 21, 2013

(30) Foreign Application Priority Data

May 15, 2012 (EP) .................................. 12382178

(51) Int. Cl.
| | |
|---|---|
| G01V 1/16 | (2006.01) |
| B64C 27/68 | (2006.01) |
| B64C 39/02 | (2006.01) |
| B64C 27/51 | (2006.01) |
| G01V 1/18 | (2006.01) |
| F42B 12/36 | (2006.01) |

(52) U.S. Cl.
CPC ............... *G01V 1/168* (2013.01); *B64C 27/51* (2013.01); *B64C 27/68* (2013.01); *G01V 1/16* (2013.01); *G01V 1/182* (2013.01); *B64C 39/02* (2013.01); *B64C 2201/082* (2013.01); *B64C 2201/123* (2013.01); *B64C 2201/185* (2013.01); *F42B 12/365* (2013.01)

(58) Field of Classification Search
CPC ....................................................... B64C 17/02
USPC ....................................................... 244/17.11
See application file for complete search history.

(56) References Cited

U.S. PATENT DOCUMENTS

| | | | | |
|---|---|---|---|---|
| 2,717,656 A | * | 9/1955 | Bannister | G01V 1/047 102/311 |
| 3,246,864 A | * | 4/1966 | Mack | B64C 29/0033 102/339 |
| 3,455,182 A | * | 7/1969 | Kelley | B64C 27/12 244/17.11 |
| 3,685,608 A | * | 8/1972 | Hamilton | G01V 1/09 181/114 |
| 3,977,479 A | * | 8/1976 | Sainsbury | E21B 1/02 173/185 |
| 4,516,227 A | * | 5/1985 | Wener | G01V 1/38 181/110 |
| 4,870,904 A | | 10/1989 | Picot | |
| 5,413,514 A | * | 5/1995 | Milligan | A63H 27/12 244/138 A |
| 6,164,594 A | * | 12/2000 | Pignol | B64D 19/02 244/138 A |

(Continued)

FOREIGN PATENT DOCUMENTS

| | | |
|---|---|---|
| EP | 2372402 A1 | 10/2011 |
| FR | 2900469 A1 | 11/2007 |

(Continued)

OTHER PUBLICATIONS

"Unattended Ground Sensor Network (UGSN)—EL/I-6001", IAI ELTA Systems Ltd., Mar. 2007, 2 pages.

(Continued)

*Primary Examiner* — Ari M Diacou
(74) *Attorney, Agent, or Firm* — Toler Law Group, PC (57) ABSTRACT

A method includes enabling a power supply of a ground sensor device to provide power to one or more components of the ground sensor device based on one or more rotations of a rotor of the ground sensor device.

20 Claims, 6 Drawing Sheets

(56) References Cited

U.S. PATENT DOCUMENTS

| | | | |
|---|---|---|---|
| 6,347,764 B1* | 2/2002 | Brandon | F42B 10/58 102/388 |
| 6,373,521 B1* | 4/2002 | Carter | G07C 5/0891 244/17.15 |
| 6,531,965 B1 | 3/2003 | Kaiser et al. | |
| 6,942,184 B1* | 9/2005 | Morris | B64D 1/02 244/138 R |
| 7,013,745 B2 | 3/2006 | Kolarczyk et al. | |
| 7,789,341 B2* | 9/2010 | Arlton | B64C 27/10 244/17.23 |
| 7,845,283 B2* | 12/2010 | Finneral | F41G 7/226 102/357 |
| 8,083,173 B2* | 12/2011 | Arlton | B64C 39/024 244/17.23 |
| 8,146,854 B2* | 4/2012 | Lawrence | B64C 39/024 244/17.23 |
| 8,172,173 B2* | 5/2012 | Carlson | B64D 19/02 244/138 A |
| 8,907,516 B2* | 12/2014 | Carroll | B64C 39/022 290/44 |
| 2004/0066451 A1 | 4/2004 | Schroth | |
| 2005/0051667 A1* | 3/2005 | Arlton | B64C 27/10 244/17.11 |
| 2008/0111884 A1 | 5/2008 | Cloutier et al. | |
| 2009/0218439 A1* | 9/2009 | Carlson | B64D 19/02 244/17.11 |
| 2010/0002423 A1* | 1/2010 | Liao | A62C 31/28 362/192 |
| 2010/0013236 A1* | 1/2010 | Carroll | B64C 39/022 290/55 |
| 2010/0219644 A1* | 9/2010 | Tigner | F03D 11/04 290/55 |
| 2010/0221112 A1* | 9/2010 | Bevirt | F03D 5/00 416/135 |
| 2011/0158040 A1* | 6/2011 | Kooper | G01V 1/223 367/13 |
| 2011/0228635 A1* | 9/2011 | Tenghamn | G01V 1/3852 367/16 |
| 2012/0134237 A1 | 5/2012 | Esteban-Campillo et al. | |

FOREIGN PATENT DOCUMENTS

| | | |
|---|---|---|
| GB | 2450789 A | 1/2009 |
| WO | 0178025 A2 | 10/2001 |
| WO | 2005072286 A2 | 8/2005 |

OTHER PUBLICATIONS

"White Papers—Trident's Family of Unattended Ground Sensors", Trident Systems Incorporated, Retrieved from <<http://www.tridsys.com/white-unattended-ground-sensors.htm>>, Retrieved on Jul. 18, 2011, Copyright 2010, 7 pages.

Communication Pursuant to Article 94(3) EPC for Application No. 10382321.7-1610, Reference No. P113064EP00, dated May 28, 2013, 5 pages.

Extended European Search Report for Application No. 10382321.7-2213, Reference No. P113064EP00, dated Sep. 6, 2011, 15 pages.

Partial European Search Report for Application No. 10382321.7-2213, Reference No. P113064EP00, dated May 3, 2011, 8 pages.

Extended European Search Report dated Feb. 21, 2013; EP Application No. 12382178.7-1559 (P117590EP00).

Audette et al., "Improved Intruder Detection Using Seismic Sensors and Adaptive Noise Cancellation"; Human, Light Vehicle, and Tunnel Detection Workshop, Hosted by the Army Research Laboratory and the National Center for Physical Acoustics; Jun. 16-17, 2009.

Lacombe et al., "Seismic Detection Algorithm and Sensor Deployment Recommendations for Perimeter Security"; Unattended Ground, Sea, and Air Sensor Technologies and Applications VIII, Proc. of SPIE vol. 6231, 623109; (2006).

* cited by examiner

DEPLOYABLE GROUND SENSORS

CLAIM OF PRIORITY

This application claims priority to European Patent Application No. 12382178.7, filed on May 15, 2012 and entitled "UNATTENDED GROUND SENSORS," the contents of which is incorporated herein by reference in its entirety.

FIELD OF THE DISCLOSURE

The present disclosure relates to deployable ground sensors that, once deployed, may be used to detect movement in a monitored area using seismic sensors.

BACKGROUND

A network of ground sensors, such as unattended ground sensors, may make use of wireless sensor networks for surveillance applications. For example, the network of ground sensors may be used in wooded zones where surveillance using radar systems is not viable.

A network typically includes battery-powered devices that use various sensors to monitor physical properties or environmental properties, such as temperature, seismic waves, or magnetic fields, to detect movement of pedestrians and vehicles. The ground sensors send data via a wireless network to a base station that processes the data provided by each ground sensor.

Typically, unattended ground sensors are sophisticated and intelligent devices. Each sensor receives data and processes the data to identify events corresponding to passage of a pedestrian or a vehicle and possibly even to discriminate between different types of events (e.g., a pedestrian event, a light vehicle event, a heavy vehicle event, etc.) and/or to determine a position of the pedestrian or the vehicle. Consequently, each sensor may be relatively expensive. In addition, a size of the sensors is relatively large and the sensors are designed for long endurance in a semi-permanent deployment. Thus, much effort may be required to plan the deployment.

There is a need for a relatively simple unattended ground sensor that may be conveniently deployed, such as from the air.

SUMMARY

Against this background, the present disclosure describes a ground sensor, such as an air-deployable unattended ground sensor. The ground sensor may include a seismic sensor, a transmitter, a controller, a power supply, and a rotor.

The seismic sensor is operable to detect seismic waves incident on the ground sensor and to generate seismic data therefrom. For example, the seismic sensor may provide a signal (e.g., an electrical signal, such as a voltage signal or a current signal) having a value that varies according to a strength of the detected seismic waves. Seismic data that corresponds to the detected seismic waves may be provided based on variations of the signal (e.g., the electrical signal). The seismic sensor may be a geophone or may be a microelectromechanical system (MEMS) seismic sensor. Alternatively or additionally, the seismic sensor may be a multi-axis sensor (e.g., a sensor that is sensitive to seismic vibrations arriving from any direction). The multi-axis sensor is advantageous where an orientation of the seismic sensor, once deployed, is not guaranteed.

The controller is operable to receive signals from the seismic sensor corresponding to the seismic data. The signals may be received directly or indirectly from the seismic sensor. For example, the ground sensor may further comprise an analogue to digital converter to digitize the seismic data provided by the seismic sensor. One or more amplifiers may be provided to amplify the signal, and one or more filters may be provided to condition the signal provided by the seismic sensor. For example, a bandpass filter may be provided such that only frequencies known to contain data that is indicative of a passing pedestrian or a passing vehicle are provided to the controller and noise or events caused by small animals passing nearby may be filtered out. Other forms of commonly employed signal conditioning will be apparent to those skilled in the art.

The controller may process the signal that corresponds to the seismic data. For example, any of the signal conditioning, such as filtering and amplifying may be performed by the controller. The controller is operable to send signals to the transmitter for onward transmission. The signals include the signals that correspond to the seismic data or are derived therefrom (e.g., after signal conditioning, such as noise suppression). The signals may be passed directly or indirectly to the transmitter from the controller.

The transmitter is operable to wirelessly transmit signals, from the ground sensor, including signals derived from the seismic data. A wireless transmission may use electromagnetic radiation. The transmitter may transmit at radio frequencies or using other methods, such as microwaves (e.g., a microwave transmission). The wireless transmission may be directional (e.g., towards a known location of a base station). The transmitter may include components for converting the signals provided by the controller into a form suitable for driving an antenna.

The power supply is arranged to provide power to the ground sensor. The power supply may provide power to at least the controller, and may also provide power to the transmitter and the seismic sensor. The power supply may be switched, such that the power supply is activated upon deployment, as described further herein.

To enable an air deployment of the ground sensor, the ground sensor is provided with the rotor. The rotor may rotate as the ground sensor falls (e.g., descends) to the ground to reduce a rate of descent of the ground sensor. For example, the ground sensor may be deployed from an aircraft such that the ground sensor descends to the ground in a controlled fashion and does not free fall to the ground. Thus, an impact between the ground sensor and the ground is reduced and a design of the ground sensor need not be overly robust. Thus, a device (e.g., the ground sensor) having a relatively delicate component such as a seismic sensor (e.g., a MEMS sensor) may be deployed from an aircraft without the ground sensor breaking when the ground sensor hits the ground.

Moreover, the present disclosure provides a small, simple, and inexpensive ground sensor that may be used in a network that includes a plurality of ground sensors. The simplified design of the ground sensors enables rapid deployment from the air as well as subsequent collection and redeployment.

The rotor may or may not be driven. For example, when the rotor is not driven, the rotor may be arranged to freewheel such that the rotor is not prevented from rotating and is enabled to rotate either freely or with a braking resistance to control a rotation speed. For example, the ground sensor may include a braking mechanism to slow rotation of the rotor. In a particular embodiment, the braking mechanism may be a gear mechanism coupled to the rotor. The gear mechanism may provide resistance and may limit the rotation speed of the rotor. Accordingly, the rate of descent of the ground sensor is reduced. Thus, the rotor may be arranged to freewheel as the ground sensor descends to the ground. The freewheeling rotor may slow the rate of descent of the ground sensor in a manner akin to powerless autorotation landings in helicopters.

Blades of the rotor may have an aerodynamic shape for freewheeling. In addition, the ground sensor may include a switch that is arranged to be activated by the rotation of the rotor. Upon activation, the switch switches on the power supply. For example, the switch may complete an electrical circuit coupling the power supply to power components of the ground sensor. The switch may be activated when the rotation of the rotor satisfies a threshold. For example, the threshold may be set such that the rotation of the rotor satisfies the threshold when the ground sensor is deployed (e.g., from an aircraft) but not by a rotation of the rotor due to accidental movements of the rotor prior to the ground sensor being deployed. Hence, the switch may be arranged to be activated by the rotation of the rotor above a threshold rate of rotation.

Alternatively, the rotor may be arranged to be driven by a motor. Thus, during descent, the motor may drive the rotor such that the rotor slows the rate of descent. The motor and the rotor may be coupled to enable the rotor to freewheel in case the motor fails during deployment.

An outer body of the ground sensor may be shaped to make deployment as easy as possible. For example, the outer body may be shaped such that the ground sensor may penetrate into the ground when the ground sensor hits the ground. For example, the ground sensor may be provided with an elongated outer body that includes a length that is longer than a width of the elongated outer body. The rotor may be provided at one end of the elongated outer body. The seismic sensor, the controller, and the power supply may be housed within the elongated outer body. The transmitter may also be housed within the elongated outer body to protect the transmitter during deployment. The seismic sensor, the controller, the power supply, the transmitter (when present within the outer body), and any other components may be stacked, one above the other, thus enabling a narrow and long outer body. In a particular embodiment, the transmitter is located at a top of a stack (e.g., at a top of the outer body) and the seismic sensor is located at a bottom of the stack.

The outer body, such as the elongated outer body, may be provided with a narrowing base to help drive the ground sensor into the ground when the ground sensor lands. The narrowing base may be located at an end of the outer body that is opposite from the rotor. The outer body may have a shape that tapers toward end. The rotor may be provided at one end of the outer body and the outer body may taper at another end. The outer body may taper at the other end to a point. For example, the other end may take the form of a spike. Ribs may extend towards the point at the base of the ground sensor. The ribs may strengthen the outer body to withstand an impact of the ground sensor hitting the ground. For example, four ribs may extend toward the point of the ground sensor. In a particular embodiment, the ribs are narrow to ease penetration of the ground sensor into the ground. The ribs may extend from a base of a main section of the outer body. The base may include a sloping surface that tapers to a point. Thus, the ribs may penetrate the ground prior to the sloping surface of the base of the main section penetrating the ground. In a particular embodiment, the main section of the outer body has a constant cross section. The constant cross section may be circular, such that the main section is cylindrical and the base is conical. With this design, penetration of the ground sensors into the ground may be aided.

To ensure the ground sensor is not inserted too far into the ground, the outer body may be provided with a collar at an end of ground sensor remote (e.g., opposite) from the base. The collar may include a widened portion with a flat underside. Thus the collar may provide a stop that prevents the ground sensor from penetrating too far into the ground. The transmitter may be positioned at a top of the ground sensor adjacent to the collar such that the transmitter is located above ground and has a field of view suitable for transmission (e.g., to radiate across the ground rather than be directed mostly upwards). The outer body may be robust enough to withstand an impact of the ground sensor into the ground considering that different firmnesses of ground may be encountered.

In a particular embodiment, the ground sensor has a top that is spaced from the collar so as to form an air gap to admit air into an interior of the outer body. The air gap enables ventilation and cooling of the components within the ground sensor. The top may be supported above the collar by supports that are equally spaced around the collar. A height of the ground sensor from the collar upwards (e.g., a portion of the ground sensor exposed above ground) may have a low profile thereby increasing covertness. For example, the height may be less than 40 millimeters (mm). In a particular embodiment, the height is less than 30 mm. In another particular embodiment, the height is about 20 mm.

In a particular embodiment, an overall height of the ground sensor is less than 200 mm. In another particular embodiment, the overall height is less than 100 mm. In a further particular embodiment, the overall height is about 90 mm.

In a particular embodiment, a height of the tapering end is less than 100 mm. In another particular embodiment, the height of the tapering end is less than 50 mm. In a further particular embodiment, the height of the tapering end is less than 30 mm. In another particular embodiment, the height of the tapering end is about 25 mm.

In a particular embodiment, a height of the main section of the outer body with constant cross section is less than 100 mm. In another particular embodiment, the height of the main section is less than 80 mm. In another particular embodiment, the height of the main section is about 60 mm.

In a particular embodiment, a width of the ground sensor at the collar is less than 100 mm. In another particular embodiment, the width of the ground sensor at the collar is less 75 mm. In another particular embodiment, the width of the ground sensor at the collar is less than 50 mm. In another particular embodiment, the width of the ground sensor at the collar is less than 40 mm.

In a particular embodiment, a width of the constant cross section of the outer body is less than 50 mm. In another particular embodiment, the width of the constant cross section is less than 35 mm. In another particular embodiment, the width of the constant cross section is about 35 mm.

In a particular embodiment, a diameter of the rotor is less than 200 mm. In another particular embodiment, the diameter of the rotor is less than 150 mm. In another particular embodiment, the diameter of the rotor is about 100 mm.

A relatively dense network may be formed from simple and cheap (e.g., inexpensive) unattended ground sensors. Accordingly, each ground sensor may not need a large detection range (e.g., an area within which passage of a pedestrian or a vehicle may be detected). In a particular embodiment, a seismic sensor of a ground sensor includes a sensitivity from 10 to 20 volts per meter per second (V/m/s). In another particular embodiment, the seismic sensor includes sensitivity from 12 to 18 V/m/s. In another particular embodiment, the seismic sensor includes a sensitivity from 14 to 16 V/m/s.

A network of unattended ground sensors may be provided, along with a base station. The base station includes a receiver configured to receive signals transmitted by the ground sensors. The network of ground sensors may be arranged with a spacing between adjacent ground sensors. In a particular embodiment, the spacing is no more than 30 m. In another particular embodiment, the spacing is no more than 20 m. In another particular embodiment, the spacing is no more than 15 m. In another particular embodiment, the spacing is no more than 10 m.

The spacing of the ground sensors may provide a dense network of ground sensors. This may be advantageous where low cost sensors are used. For example, each ground sensor may include a sensitivity in the range of 10 to 20 V/m/s, 12 to 18 V/m/s, or 14 to 16 V/m/s. The network may include more than 25, 50, 100, or 250 ground sensors. This enables an inexpensive network to be created with a number of low cost ground sensors. As well as reducing overall cost, this arrangement has a further benefit in providing a network with greater resolution due to the greater number of nodes. Moreover, better opportunities are provided in combining data produced from many more ground sensors, as described herein.

The base station may further include a processor. The processor is operable to process the signals received by the receiver and to identify events corresponding to movement of a pedestrian or a vehicle across the ground recorded by the ground sensor that provided the signal being processed.

Using the seismic data pushed to the base station, the base station processes the seismic data (e.g., received signals), which simplifies requirements for the ground sensors, thus enabling a cost associated with each ground sensor to be reduced. Accordingly, seismic data corresponding to the signals is sent from the ground sensors to the base station, and the base station performs the analysis of the seismic data. It is to be understood that the ground sensors may perform some manipulation of the seismic data, such as to reduce noise, to amplify the signal, or to select frequency bands of interest. In any event, the signal transmitted by the ground sensor still corresponds to the seismic signal recorded by the seismic sensor. The ground sensors may not determine whether an event corresponding to the movement of a pedestrian or vehicle has occurred.

Thus, the processor at the base station collects the seismic data from the ground sensors. The processor may be operable to analyze the received signals to characterize the pedestrian or the vehicle detected. The processor of the base station may perform analysis of the seismic data from the ground sensors in a comparative manner, as well as analyzing the data from each ground sensor in isolation. For example, the data received may be fused, as is well known in the art. Comparative analysis may be used to verify the detection of events and/or to reduce the instances of false detections. Further, comparative analysis may be used to track a pedestrian or a vehicle.

In a particular embodiment, a method of manufacturing a ground sensor, such as an unattended ground sensor, is described. The method includes installing a seismic sensor into an outer body. The seismic sensor may be configured to detect seismic waves incident on the ground sensor and to generate seismic data from the detected seismic waves. The ground sensor also includes a transmitter operable to transmit wirelessly signals from the ground sensor. The ground sensor further includes a controller operable to receive signals from the seismic sensor corresponding to the seismic data and to send signals to the transmitter for onward transmission. The ground sensor further includes a power supply arranged to provide power to the ground sensor and a rotor operable to retard a rate of descent of the ground sensor during deployment.

In another particular embodiment, a method of deploying a ground sensor, such as an unattended ground sensor, including a rotor that is freewheeling is described. The method includes deploying the ground sensor from an aircraft. The rotor of the deployed ground sensor freewheels to slow a rate of descent of the ground sensor as the ground sensor falls to the ground. The rotor may be enabled to rotate freely or may be controlled through a braking force (e.g., using a gear mechanism) to limit a speed of rotation. The ground sensor may be deployed from a height of 50-250 meters (m) above the ground. For example, the ground sensor may be deployed from a height of about 100 m above the ground. The ground sensors may be deployed from a helicopter. When deployed, the ground sensor may penetrate the ground upon impact.

In another particular embodiment, a method of deploying a ground sensor, such as an unattended ground sensor, having a rotor that is driven by a motor is described. The method includes deploying the ground sensor from an aircraft. The motor drives the rotor to rotate the rotor and to control a rate of descent of the ground sensor as the ground sensor descends to the ground. The ground sensor may penetrate the ground upon impact.

BRIEF DESCRIPTION OF THE DRAWINGS

The present disclosure may be more readily understood based on the particular embodiments that are described herein, by way of example only, with reference to the following drawings in which.

DETAILED DESCRIPTION

Figure 1:
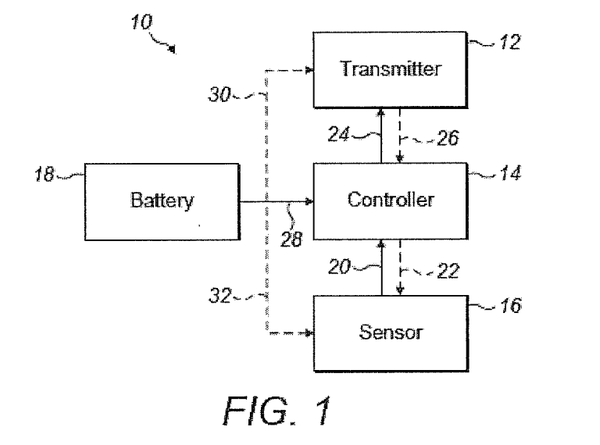
FIG. 1 is a diagram that illustrates a particular embodiment of an air-deployable unattended ground sensor.

FIG. 1 illustrates a particular embodiment of a ground sensor 10, such as an air-deployable unattended ground sensor, including multiple electrical components. The ground sensor 10 may be deployed from the air (e.g., via an aircraft).

The ground sensor 10 includes a transmitter 12, a controller 14, and a sensor 16. In a particular embodiment, the sensor 16 is a seismic sensor, such as a micro-electromechanical system (MEMS) seismic sensor. The sensor 16 detects vibrations transmitted to the ground sensor 10 when the ground sensor 10 is deployed in the field (e.g., in an area on the ground). In a particular embodiment, the ground sensor 10 penetrates the ground upon impact, thereby improving detection of vibrations. However, the ground sensor 10 may not penetrate the ground and, instead, may come to rest on a surface of the ground (e.g., a side of the ground sensor 10 may rest on the surface of the ground). Any movement across the ground close to the ground sensor 10 may cause vibrations to travel through the ground. Seismic vibrations impinging on the ground sensor 10 may be detected by the sensor 16. For example, the vibrations may be reproduced as a voltage output of the sensor 16. The ground sensor 10 may be sensitive enough to detect the vibrations when the ground sensor 10 has penetrated the ground or when lying on the ground.

A battery 18 provides power to the ground sensor 10. The battery 18 may be switched on during deployment, as is explained herein.

The controller 14 manages operation of the ground sensor 10. The controller 14 may send signals 22 (as indicated by the dashed arrow in FIG. 1 between the controller 14 and the sensor 16) to the sensor 16. For example, the controller 14 may set a frequency with which the sensor 16 collects data. In addition, the controller 14 receives signals 20 (as indicated by a solid arrow in FIG. 1 between the controller 14 and the sensor 16) from the sensor 16. The signals 20 may correspond to the voltage output of the sensor 16. The controller 14 processes the signals 20 received from the sensor 16. For example, the controller 14 may filter the signals 20 to reduce noise and/or may amplify the signals 20. The controller 14 may perform more sophisticated processing of the signals 20 received from the sensor 16. For example, the controller 14 may discriminate between actual movements of people or vehicles as opposed to other ambient vibrations. However, in some embodiments, the ground sensor 10 may be a simple device, and a relatively unsophisticated controller 14 may be used to provide conditioning of the signals 20 received from the sensor 16.

The controller 14 passes signals 24 (as indicated by the solid arrow between the controller 14 and the transmitter 12) to the transmitter 12 for onward transmission to a base station or the like. For example, the controller 14 may provide the signals 24 to the transmitter 12 after conditioning the signals 20 from the sensor 16. The controller 14 may send the signals 24 whenever the signals 24 are available for transmission, or may store data in a memory (not shown) such that batches of data may be sent periodically. The transmitter 12 may include a transceiver capable of receiving signals that are passed to the controller 14 as signals 26 (as indicated by the dashed arrow in FIG. 1 between the transmitter 12 and the controller 14). For example, diagnostic signals may be sent to the ground sensor 10 to elicit a response that indicates that the ground sensor 10 is functioning correctly.

The battery 18 provides power 28 (as indicated by the solid arrow between the battery 18 and the controller 14) to the controller 14. The controller 14 may distribute power to other components of the ground sensor 10 that require power, such as the transmitter 12 and/or the sensor 16. Alternatively, the battery 18 may supply power 30 directly to the transmitter 12 (as indicated by the dashed line of FIG. 1 between the transmitter 12 and the battery 18) and may supply power 32 directly to the sensor 16 (as indicated by the dashed line of FIG. 1 between the between the battery 18 and the sensor 16).

The battery 18 may be rechargeable and may be recharged from a solar cell provided on the ground sensor 10. Other power sources, such as fuel cells, may be used in place of the battery 18.

The sensor 16 may gather data continuously or may gather data periodically. A frequency at which the sensor 16 gathers data may be set by the controller 14 and may be varied. For example, the controller 14 may increase the frequency at certain times of day or after receiving a signal indicating movement nearby. The sensor 16 may gather data continuously, but the controller 14 may accept a signal from the sensor 16 only when the signal varies above a threshold. This enables general background noise to be ignored and data to be collected only when an amplitude of a signal arises that includes a magnitude that is indicative of movement nearby.

Figure 2:
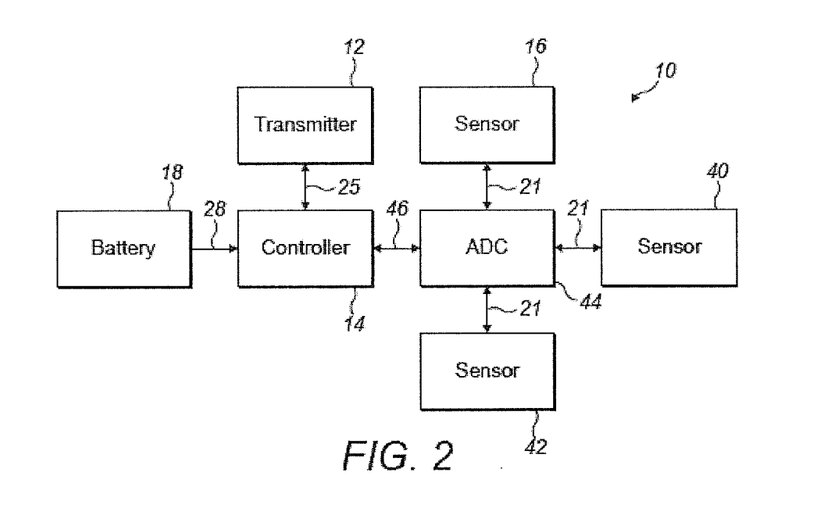
FIG. 2 is a diagram that illustrates another particular embodiment of an air-deployable unattended ground sensor.

FIG. 2 illustrates another particular embodiment of the ground sensor 10. The ground sensor 10 of FIG. 2 may operate in accordance with the ground sensor 10 as described with reference to FIG. 1.

Referring to FIG. 2, the ground sensor 10 includes the controller 14, the transmitter 12, multiple sensors, and an analogue to digital converter (ADC) 44. The multiple sensors may include a first sensor 16, a second sensor 40, and a third sensor 42.

The battery 18 supplies electricity directly to the controller 14 as indicated by arrow 28 of FIG. 2. The controller 14 provides a regulated power supply to the remaining components of the ground sensor 10 as indicated by arrows 21, 25, and 46 in FIG. 2. Alternatively, the battery 18 may supply power directly to the other components of the ground sensor 10.

The transmitter 12 may include a transceiver. In a particular embodiment, the transmitter 12 is only configured to transmit.

The ground sensor 10 may include multiple sensors, such as the first sensor 16, the second sensor 40, and the third sensor 42. The first sensor 16 may include a seismic sensor as described with reference to FIG. 1. The second sensor 40 may include a temperature sensor to provide a signal that varies according to the ambient temperature. The third sensor 42 may include a magnetic field sensor to provide a signal that varies with a sensed magnetic field. Variations in a sensed temperature and a sensed magnetic field may be indicative of a pedestrian or a vehicle passing by the ground sensor 10.

In a particular embodiment, the first sensor 16, the second sensor 40, and the third sensor 42 each produce analogue signals. The analogue signals are passed to the ADC 44 as indicated by arrows 21. For example, the ADC 44 may include a sixteen-bit ADC that digitizes the analogue signals provided by the sensors 16, 40, and 42. The ADC 44 may provide further functionality, such as amplification and filtering. The ADC 44 provides to the controller 14, as indicated by the arrow 46, the digitized signals based on the analogue signals received from the sensors 16, 40, and 42. The digitized signals may be passed in parallel or in series, such as after multiplexing. The controller 14 processes the digitized signals received from the ADC 44 and sends the results to the transmitter 12 for transmission, as described with reference to FIG. 1.

Although FIGS. 1 and 2 illustrate particular electrical components included in the ground sensor 10, such as an air-deployable unattended ground sensor, it should be understood that other electrical components may be included. For example, the ground sensor 10 of FIGS. 1 and 2 may include a rotor. In a particular embodiment, the rotor may be powered by an electric motor. The electric motor may receive power directly from the battery 18 or indirectly from the battery 18 via the controller 14.

FIGS. 3-8 illustrate another particular embodiment of the ground sensor 10. The ground sensor 10 may have a generally elongated body 100 that includes a generally cylindrical main section 102. The cylindrical main section 102 may extend between a pointed base 104 and a collar 106. A rotor 101 is located at the collar-end of the elongated body 100.

Figure 3:
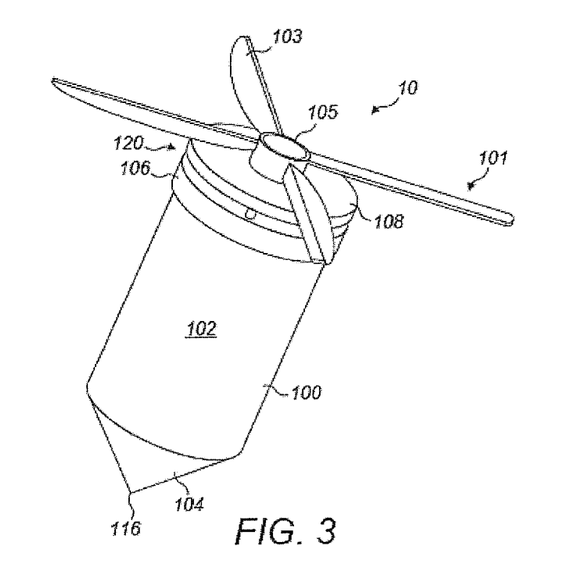
FIG. 3 is a diagram that illustrates another particular embodiment of an air-deployable unattended ground sensor.
Figure 8:
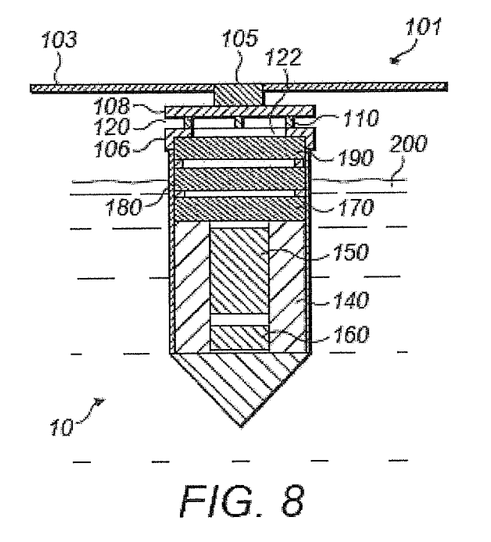
FIG. 8 is a longitudinal section through the air-deployable unattended ground sensor of FIG. 3 after deployment.

The rotor 101 may include blades 103, such as four blades, that extend from a central hub 105. The blades 103 may have an aerodynamic shape that is configured for performance as a freewheeling rotor. The central hub 105 may be mounted on a shaft (not shown) that is aligned with a longitudinal axis of the ground sensor 10. In a particular embodiment, the shaft is arranged so as to enable the rotor 101 to rotate freely. Thus, upon deployment from an aircraft, the rotor 101 may freewheel as the rotor 101 falls by virtue of air rushing past the blades 103. The freewheeling of the rotor 101 may slow a descent of the ground sensor 10, akin to an autorotation landing in a helicopter. In another particular embodiment, the rotor 101 is coupled to the shaft in a way that enables the rotational speed of the rotor 101 to be controlled. For example, a gear mechanism that includes small gears may be used to set an upper rotational speed of the rotor 101 that enables a rate of descent of the ground sensor 10 to be limited to a minimum. Maintaining a minimum rate of descent assists in the ground sensor 10 penetrating the ground, such as the ground 200 as shown in FIG. 8.

Rotations of the rotor 101 may be used to activate a battery 160, such as the battery 18 of FIGS. 1 and 2. For example, battery power is not required prior to deployment. In order to avoid running down the battery 160 prior to deployment, the battery 160 may be set to be inactive. The battery 160 may be activated by rotation of the rotor 101, such as rotation during deployment of the ground sensor 10. To avoid the battery 160 being switched on too early (e.g., as a result of the rotor 101 being moved during general handling of the ground sensor 10), the battery 160 may be activated when the rotor 101 rotates at a threshold speed. The threshold speed may be set to be a typical speed encountered during deployment, such as 180 revolutions per minute. Alternatively, the rotor 101 may be powered by a motor. Upon deployment, the motor is used to drive the rotor 101 to provide lift so as to control the rate of descent of the ground sensor 10.

The elongated body 100 may be circular in cross-section. A cap 108 may be supported above the collar 106 by posts 110 (e.g., four posts). The cap 108 may be solid and may provide protection for components that are housed within the elongated body 100. An air passage 120 may extend between the collar 106, the cap 108, and the posts 110, and may enable air to pass into the interior of the elongated body 100 via an aperture, such as an aperture 122 as shown in FIG. 8, provided in a top of the collar 106.

The pointed base 104 of the elongated body 100 may be conical and may terminate at a sharp point 116. The pointed base 104 may aid penetration of the ground sensor 10 into the ground 200. The rotor 101 ensures that the ground sensor 10 is orientated with the rotor 101 at the top and the pointed base 104 at the bottom as the ground sensor 10 descends to the ground 200. The ground sensor 10 may strike the ground 200 with enough force, for most ground types, for the pointed base 104 to penetrate the ground 200. The elongated body 100 may be constructed so as to be robust and not break under such repeated action. The ground sensor 10 may also function when the ground sensor 10 strikes the ground 200 and then comes to rest with a side of the ground sensor 10 on a surface of the ground 200.

Referring to FIG. 8, when the ground sensor 10 is successfully buried into the ground 200, the point 116 penetrates the ground 200 and the ground 200 is pushed aside to provide clearance for a main section 102 of the elongated body 100. The collar 106 may ensure the ground sensor 10 is not completely buried in the ground 200. When the ground sensor 10 penetrates the ground 200 deeply, such as when the ground 200 is soft, an underside of the collar 106 may make contact with a surface of the ground 200 and may bring the ground sensor 10 to a halt. By designing the ground sensor 10 to penetrate the ground 200, more of the ground sensor 10 resides within the ground 200 and the ground sensor 10 may be more sensitive to seismic vibrations travelling through the ground 200. Also, as less of the ground sensor 10 projects above the ground 200, the ground sensor 10 is well hidden and less likely to be discovered.

Figure 7:
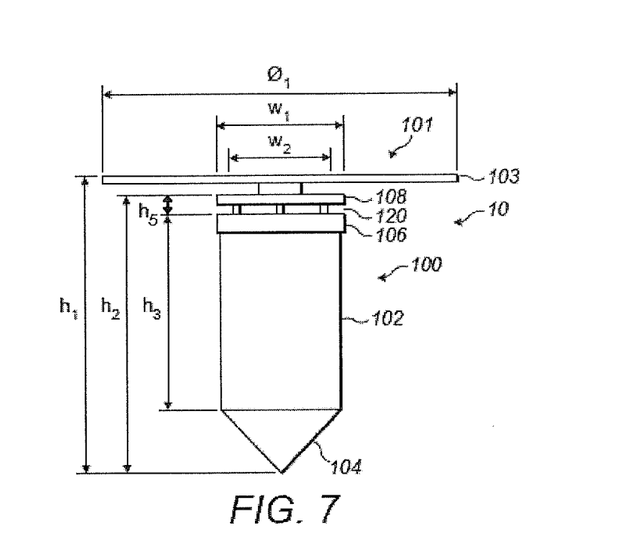
FIG. 7 is a side view of the air-deployable unattended ground sensor of FIG. 3.

Referring to FIG. 7, in a particular embodiment, the ground sensor 10 has an overall height $h_1$ of 90 millimeters (mm). The height $h_2$ of the ground sensor 10 excluding the rotor 101 is 84 mm, with the height $h_5$ of the air passage 120 being 5 mm. The main section 102 of the elongated body 100 has a height $h_3$ of 55 mm. The diameter $\varnothing_1$ of the rotor 101 is 90 mm. The width $w_1$ of the elongated body 100 at its widest point, including the cap 108 and collar 106, is 40 mm. The main section 102 of the elongated body 100 has a width $w_2$ of 35 mm.

Figure 4:
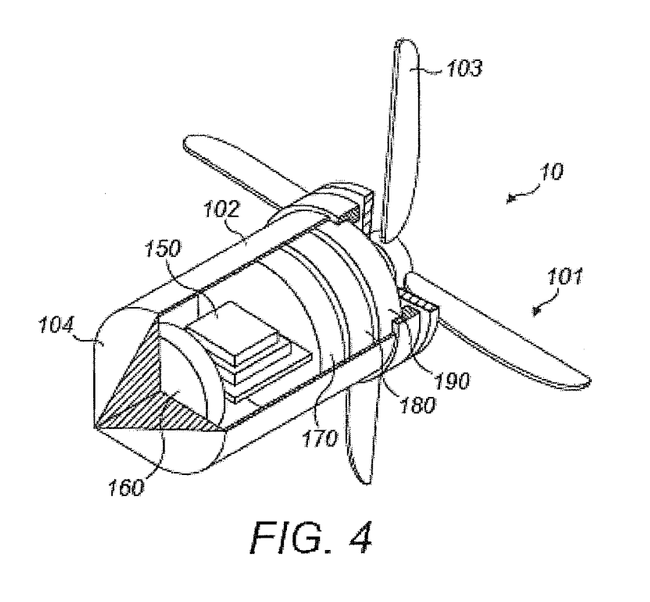
FIG. 4 is a partial cut-away perspective view of the air-deployable unattended ground sensor of FIG. 3.

Referring to FIG. 4, the elongated body 100 may be provided with a hollow center that houses several components. An internal diameter of the hollow center (e.g., interior) of the elongated body 100 may vary in accordance with a size of one or more components. Alternatively, the hollow center of the main section 102 may have a constant internal diameter. Referring to FIG. 8, a shaped sleeve 140 is inserted into the hollow center of the elongated body 100. The shaped sleeve 140 has an outer diameter that matches the internal diameter of the elongated body 100 to ensure a snug fit. The internal diameter of the shaped sleeve 140 varies to match the sizes of the components.

Figure 5:
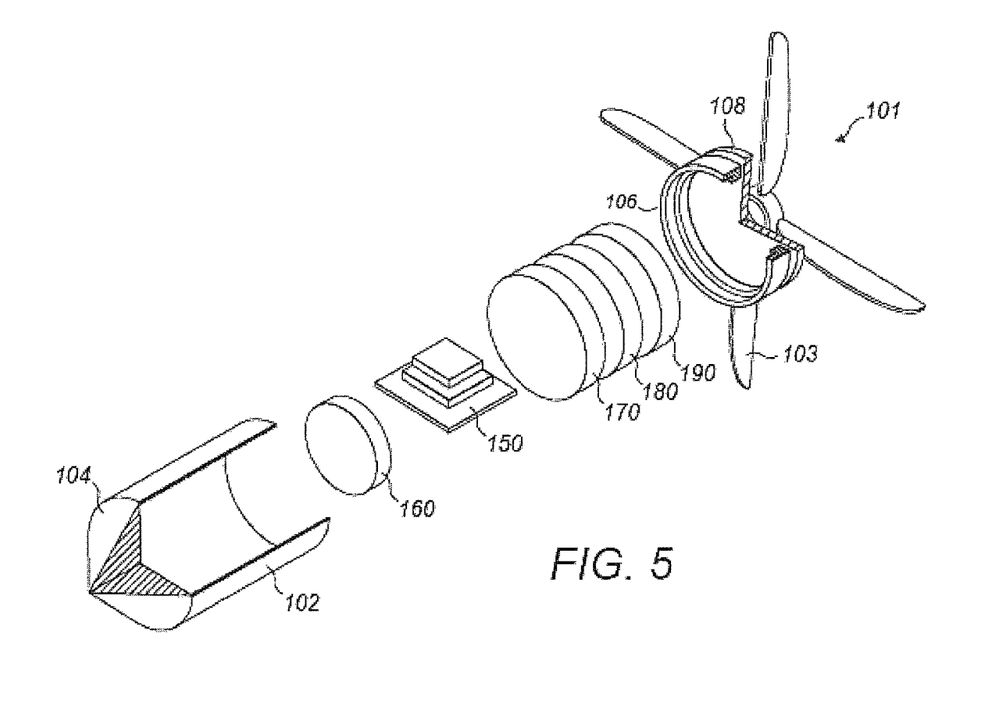
FIG. 5 is an exploded view of the air-deployable unattended ground sensor of FIG. 3, showing the same partial cut-away perspective as FIG. 4.
Figure 6:
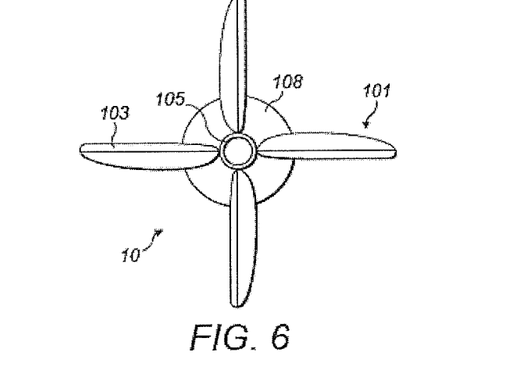
FIG. 6 is a top view of the air-deployable unattended ground sensor of FIG. 3.

Referring to FIGS. 4, 5, and 8, the elongated body 100 may house the components in a stack configuration (e.g., one component above the other). The battery 160 may be located at the bottom of the stack. For example, the battery 160 may include the battery 18 of FIGS. 1 and 2. The battery 160 may be firmly supported by the shaped sleeve 140. In a particular embodiment, the battery 160 is a wafer cell battery. A 1.0 Ampere-hour (Ah) wafer cell battery has been found to produce a typical working life of 50 days. The battery 160 may be switched on during deployment, as described herein. In a particular embodiment, the battery 160 includes a rated voltage of 3.6 volts (V). In another particular embodiment, the battery 160 includes a maximum recommended continuous current of 10 milliamp (mA). In another particular embodiment, the battery 160 includes a maximum pulse current of 50 mA. In another particular embodiment, the battery 160 includes an operating range of −55 degrees Celsius (° C.) to +85° C.

A seismic sensor 150, such as a MEMS seismic sensor, may be located above the battery 160. The seismic sensor 150 may be firmly supported by the shaped sleeve 140 and the snug fit of the shaped sleeve 140 within the elongated body 100 ensures strong coupling of seismic waves from the ground 200 to the seismic sensor 150. The seismic sensor 150 may have a common length and width of 19.8 mm and a height of 15.0 mm. In a particular embodiment, the seismic sensor 150 is a Colibrys SF2005 seismic sensor available from www.colibrys.com or ACAL BFi (Spain), C/Anabel Segura, 7 Planta Acceso, 28108, Alcobendas Madrid, Spain. The seismic sensor 150 may be sensitive to seismic vibration irrespective of an orientation of the ground sensor 10. The orientation of the ground sensor 10 may be based on whether the ground sensor 10 penetrates the ground 200 to come to rest vertically (e.g., a vertical position as shown in FIG. 8), penetrates the ground 200 to rest at an arbitrary angle relative to vertical, or does not penetrate the ground 200 and comes to rest upon a local topography of the ground 200 where the ground sensor 10 lays (e.g., the ground sensor 10 lays on a side of the ground sensor 10) such that the ground sensor 10 may adopt any arbitrary angle relative to vertical.

The seismic sensor 150 may be a capacitive MEMS sensor with good seismic and vibration sensing when extreme low noise measurement is required. The seismic sensor 150 has a wide dynamic range, excellent bandwidth, low distortion and good thermal stability. Furthermore, the seismic sensor 150 may have shock resistance of up to 1500 g.

A sensor board 170 (e.g., a controller board) may be located above the seismic sensor 150. The sensor board 170 may include a controller and an analogue to digital converter (ADC). For example, the controller may include and operate in accordance with the controller 14 of FIGS. 1 and 2. The ADC may include and operate in accordance with the ADC 44 of FIG. 2. The sensor board 170 may be an electronics circuit board, such as an application specific integrated circuit (ASIC) board. The controller of the sensor board 170 may operate at 16 million instructions per second (MIPS) throughput up to 16 megahertz (MHz). The sensor board 170 may also include a temperature sensor and a magnetic field sensor, such as the second sensor 40 and the third sensor 42 of FIG. 2, and other associated circuits of the ground sensor 10 may be located on the sensor board 170.

A radio board 180 may be located above the sensor board 170 and may be sandwiched between the sensor board 170 and an antenna 190. The radio board 180 may convert the signals provided by a controller of the sensor board 170 into a form suitable for radio transmission and may use the converted signals as a driving signal to the antenna 190. Alternatively, a single board may be used that includes the sensor board 170 and the radio board 180. For example, an Atmel ATmega128RFA1 (available from Atmel Corporation, 2325 Orchard Parkway, San Jose, Calif. 95131, USA) may be used that is a single component based on the combination of an ATmega1281 microcontroller and an AT86RF231 radio transceiver. In a particular embodiment, the antenna 190 is a printed circuit board 3 decibel isotropic (dBi) dipole antenna. The electrical connections between the components are not shown in the FIGS. 3-8. Air passages, not shown in the figures, may be provided between the components to aid cooling.

The ground sensor 10 may be taken apart to enable components to be replaced, such as the battery 160. For example, the collar 106 may couple to the elongated body 100 via a screw thread. The collar 106 and the cap 108 may be unscrewed to enable access to an interior of the elongated body 100. Where a sleeve, such as the shaped sleeve 140 of FIG. 8, is provided, the sleeve may be slid out from the elongated body 100. Alternatively, the sleeve may be split longitudinally to enable access to the components.

Figure 9:
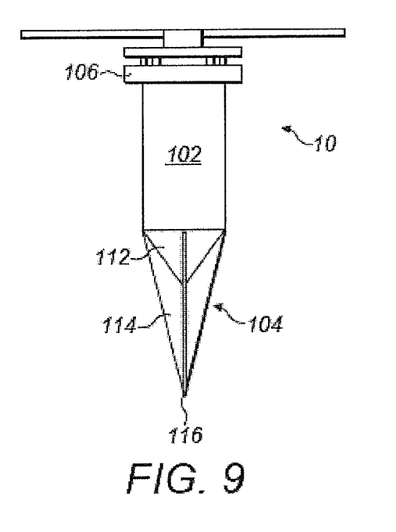
FIG. 9 is a diagram that illustrates another particular embodiment of an air-deployable unattended ground sensor.

FIG. 9 illustrates another particular embodiment of the ground sensor 10. The pointed base 104 of the elongated body 100 includes a conical part 112 and ribs 114 (e.g., four ribs) that extend downwardly from the conical part 112 to meet at a sharp point 116. In the embodiment illustrated in FIG. 9, the pointed base 104 is provided to aid penetration of the ground sensor 10 into the ground, such as the ground 200 as shown in FIG. 8. As the sharp point 116 penetrates the ground, the ground is pushed aside by the ribs 114 and the conical part 112 until a hole is formed in the ground with sufficient size to provide clearance for the main section 102.

Figure 10:
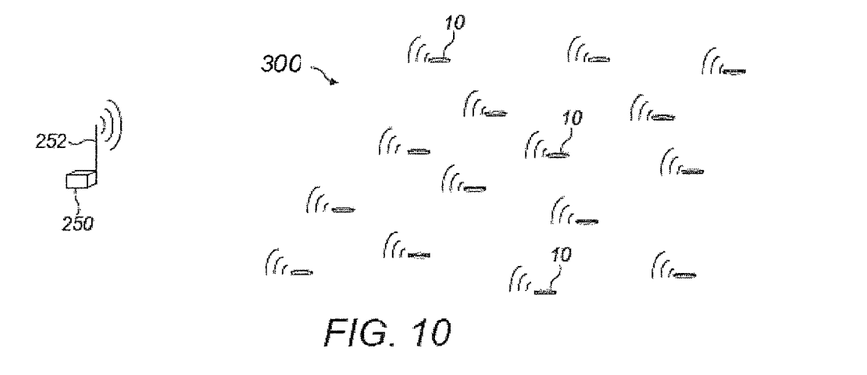
FIG. 10 is a diagram that illustrates a first particular embodiment of a network of air-deployable unattended ground sensors using any of the air-deployable unattended ground sensors of FIGS. 1-9.
Figure 11:
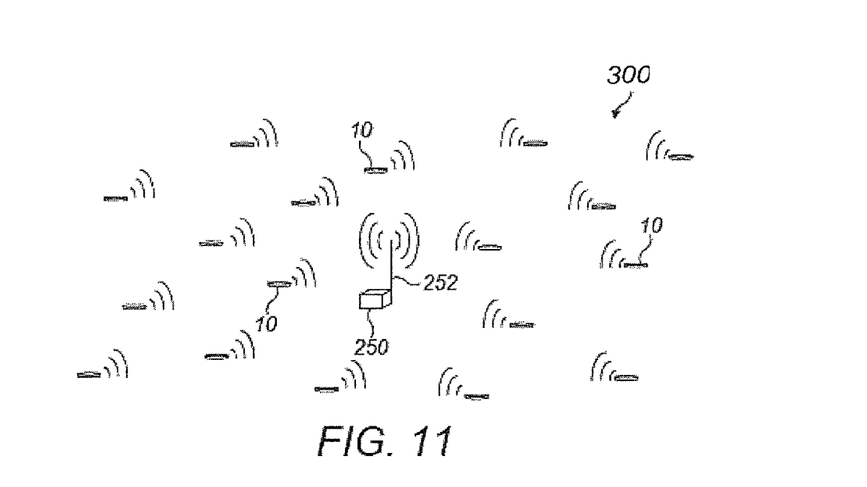
FIG. 11 is a diagram that illustrates a second particular embodiment of a network of air-deployable unattended ground sensors using any of the air-deployable unattended ground sensors of FIGS. 1-9.

FIGS. 10 and 11 illustrate a network 300 that includes multiple ground sensors 10 (e.g., unattended ground sensors). Ground sensors 10 within the network 300 may have different configurations. The ground sensors 10 may be spread out to form an array. Although FIGS. 10 and 11 show fifteen to twenty ground sensors 10 in the network 300, it should be understood that the network 300 may include a hundred or more ground sensors 10. The ground sensors 10 communicate with a base station 250 that includes a transceiver 252. The base station 250 may be located remotely from the network 300 of ground sensors 10, as shown in FIG. 10. Alternatively, the base station 250 may be located within the network 300 of ground sensors 10, as shown in FIG. 11. The base station 250 may receive signals (e.g., data) from each of the ground sensors 10. The signals correspond to the data provided by the one or more sensors, such as the sensors 16, 40, 42 of FIG. 2. In a particular embodiment, the bulk of data analysis is performed centrally at the base station 250. Accordingly, each ground sensor 10 performs limited processing of data received from the one or more sensors before transmitting the data to the base station 250.

The base station 250 may include at least one processor (not shown) to analyze the incoming data. The data from each ground sensor 10 may be analyzed to determine occurrences, or events, such as detection of a passing pedestrian or detection of a passing vehicle. Such an occurrence may cause an alarm to be generated. Further analysis may be able to characterize the occurrence. For example, movement of a pedestrian may have a different signature than movement of a vehicle. Further, movement of heavy and light vehicles may have different signatures, as well as wheeled vehicles as compared to tracked vehicles.

Data from several ground sensors 10 may be fused to enable a determination of a position of a moving object through triangulation. Moreover, an object may be tracked, either merely by following a first occurrence detected by one ground sensor 10, followed by a second occurrence detected by a second ground sensor 10, and so on, or by determining successive positions of the object using multiple ground sensors 10. Fusing data from multiple ground sensors 10 also enables more reliable detection of events (e.g., better discrimination of false alarms). The ability to fuse data is an advantage of the network arrangement described herein where data processing is handled centrally at the base station 250 rather than pushing processing out to the ground sensors 10.

The plurality of ground sensors 10 may be rapidly deployed to form the network 300. For example, the ground sensors 10 need not be precisely positioned within the network 300. Thus, operators may simply deploy the ground sensors 10 from the air and the inevitable inaccuracies as to where each ground sensor 10 will land can be tolerated.

It will be clear to the skilled person that variations may be made to the above embodiments without necessarily departing from the scope of the disclosure.

In a particular embodiment, a ground sensor (e.g., an air-deployable unattended ground sensor) includes a seismic sensor, a transmitter, a controller, a power supply, an outer body, and a rotor. The seismic sensor is operable to detect seismic waves incident upon the air-deployable unattended ground sensor and to generate seismic data therefrom. The transmitter is operable to wirelessly transmit signals from the ground sensor. The controller is operable to receive signals from the seismic sensor corresponding to the seismic data and to send signals to the transmitter for onward transmission. The power supply is arranged to provide power to one or more components of the ground sensor. The outer body houses the seismic sensor, the controller, and the power supply. The rotor is provided at one end of the outer body.

The rotor of the ground sensor may be capable of freewheeling. The ground sensor may further include a braking mechanism (e.g., a gear mechanism coupled to the rotor) to slow rotation of the rotor. The power supply of the ground sensor may be arranged to provide power to the ground sensor (e.g., one or more components of the ground sensor) upon activation of a switch during deployment. For example, the switch may be arranged to be activated by rotation of the rotor, such as by rotation of the rotor above a threshold rate of rotation. The ground sensor may further include a motor for powering the rotor.

The outer body of the ground sensor may be elongated. The rotor may be provided at one end of the elongated outer body and the elongated outer body may taper at the other end (e.g., may taper to a point at the other end of the elongated body). The taper of the elongated body may include ribs that extend and narrow to meet at another point. The seismic sensor, the controller, the power supply, and the transmitter may be arranged in a stack (e.g., one above another) within the elongated outer body. The elongated body may be provided with a collar at the end adjacent to the rotor. The ground sensor may further include a top that is spaced from the collar so as to form an air gap to admit air into an interior of the elongated outer body.

In a particular embodiment, a network includes a base station and a plurality of ground sensors (e.g., a plurality of unattended ground sensors). The base station includes a receiver and a processor. The receiver is operable to receive signals corresponding to seismic data transmitted by the plurality of ground sensors. The processor is operable to process the received signals corresponding to the seismic data and to identify events corresponding to movement of a pedestrian or a vehicle across the ground recorded by a particular ground sensor that provided a particular signal being processed. The plurality of ground sensors may include the particular ground sensor. The particular ground sensor includes a seismic sensor, a transmitter, a controller, a power supply, an outer body, and a rotor. The seismic sensor is operable to detect seismic waves incident upon the particular ground sensor and to generate particular seismic data therefrom. The transmitter is operable to wirelessly transmit signals from the particular ground sensor. The controller is operable to receive signals from the seismic sensor corresponding to the particular seismic data and to send one or more signals to the transmitter for onward transmission. The power supply is arranged to provide power to one or more components of the particular ground sensor. The outer body houses the seismic sensor, the controller, and the power supply. The rotor is provided at one end of the outer body.

In a particular embodiment, a method of deploying a ground sensor includes deploying the ground sensor from an aircraft. The ground sensor includes a seismic sensor, a transmitter, a controller, a power supply, an outer body, and a rotor. The seismic sensor is operable to detect seismic waves incident upon the ground sensor and to generate seismic data therefrom. The transmitter is operable to wirelessly transmit signals from the ground sensor. The controller is operable to receive signals from the seismic sensor corresponding to the seismic data and to send signals to the transmitter for onward transmission. The power supply is arranged to provide power to one or more components of the ground sensor. The outer body houses the seismic sensor, the controller, and the power supply. The rotor is provided at one end of the outer body. The ground sensor may be deployed from the aircraft such that the rotor freewheels thereby slowing a rate of descent of the ground sensor as it falls to the ground.

The method may further include causing the power supply to be switched on based on a rotation of the rotor. The method may include deploying the ground sensor from the aircraft and using a motor of the ground sensor to drive the rotor such that the rotor rotates to control the rate of descent of the ground sensor as the ground sensor descends to the ground.

What is claimed is:

1. A method comprising:
   enabling a power supply of a ground sensor device to provide power to one or more components of the ground sensor device based on one or more rotations of a rotor of the ground sensor device, wherein the components include a seismic sensor configured to detect seismic waves and to generate seismic data based on the detected seismic waves, and wherein enabling the power supply includes switching the power supply from inactive to active based on the one or more rotations of the rotor.

2. The method of claim 1, further comprising deploying the ground sensor from an aircraft, wherein deploying the ground sensor device automatically causes the rotor to rotate.

3. The method of claim 1, further comprising activating a switch of the ground sensor device based on the one or more rotations of the rotor.

4. The method of claim 3, wherein activating the switch causes the power supply to provide the power to the one or more components.

5. The method of claim 3, wherein the power supply is enabled to provide power to a controller and to a transmitter of the ground sensor device upon activation of the switch.

6. The method of claim 3, wherein the switch is activated when a rate of rotation associated with the one or more rotations of the rotor satisfies a threshold value.

7. A ground sensor device comprising:
   one or more components including at least one sensor, wherein the at least sensor includes a seismic sensor configured to detect seismic waves and to generate seismic data based on the detected seismic waves;
   a power supply; and
   a rotor, wherein the power supply is configured to switch power from inactive to active for the one or more components based on one or more rotations of the rotor.

8. The ground sensor device of claim 7, wherein the power supply is configured to switch the power from inactive to active in response to the rotor rotating at a rate that satisfies a threshold number of revolutions per minute.

9. The ground sensor device of claim 7, wherein the seismic sensor is a micro-electromechanical system (MEMS) seismic sensor.

10. The ground sensor device of claim 7, wherein the at least one sensor includes a temperature sensor, a magnetic field sensor, or a combination thereof.

11. The ground sensor device of claim 7, wherein the power supply includes a battery.

12. The ground sensor device of claim 7, wherein the one or more components further include:
   a transceiver, wherein the transceiver is configured to wirelessly transmit data associated with the at least one sensor; and
   a controller, wherein the controller is configured to:
      receive one or more signals from the at least one sensor;
      process the one or more signals to generate the data; and provide the data to a transmitter for wireless transmission of the data.

13. The ground sensor device of claim 7, further comprising an outer body, wherein the one or more components and the power supply are housed in an interior of the outer body, and wherein the rotor is coupled to the outer body.

14. The ground sensor device of claim 13, wherein the rotor is configured to rotate relative to the outer body.

15. The ground sensor device of claim 7, wherein the rotor is configured to freewheel or be driven by a motor.

16. The ground sensor device of claim 7, further comprising a motor, wherein the motor is configured to drive the rotor, and wherein, when the motor is inoperable to drive the rotor, the rotor is enabled to freewheel.

17. The ground sensor device of claim 7, further comprising a switch, wherein the switch is configured to be activated based on the one or more rotations of the rotor, and wherein the power supply is enabled to provide power to the one or more components when the switch is activated.

18. A network comprising:
a plurality of ground sensor devices, wherein at least one ground sensor device of the plurality of ground sensor devices comprises:
one or more components including at least one sensor, wherein the at least sensor includes a seismic sensor configured to detect seismic waves and to generate seismic data based on the detected seismic waves;
a power supply; and
a rotor, wherein the power supply is configured to switch power from inactive to active for the one or more components based on one or more rotations of the rotor; and
a base station comprising:
a transceiver to receive signals corresponding to sensor data transmitted by one or more ground sensor devices of the plurality of ground sensor devices; and
a processor to:
process the signals received via the transceiver; and
identify an event based on the processed signals.

19. The network of claim 18, wherein the sensor data is associated with the seismic data wherein the at least one ground sensor device further includes a controller, a transmitter, and outer body, and wherein the seismic sensor, the controller, and the transmitter are arranged in a stack configuration within an interior of the outer body.

20. network of claim 18, wherein the transceiver of the base station is configured to send a diagnostic signal to the at least one ground sensor device to test a function of the at least one ground sensor, and wherein the event corresponds to seismic activity detected by one or more of the plurality of ground sensor devices.

* * * * *